US012795307B2

(12) United States Patent
Pedersen et al.

(10) Patent No.: US 12,795,307 B2
(45) Date of Patent: Nov. 10, 2026

(54) METHOD OF REDUCING WIND NOISE IN A HEARING DEVICE

(71) Applicant: Oticon A/S, Smørum (DK)

(72) Inventors: Michael Syskind Pedersen, Smørum (DK); Adam Kuklasiński, Smørum (DK); Asger Heidemann Andersen, Frederikssund (DK); Cristian Andrés Gutiérrez Acuña, Smørum (DK); Fares El-Azm, Smørum (DK); Sam Nees, Smørum (DK); Sigurdur Sigurdsson, Smørum (DK); Silvia Tarantino, Smørum (DK)

(73) Assignee: Oticon A/S, Smørum (DK)

( * ) Notice: Subject to any disclaimer, the term of this patent is extended or adjusted under 35 U.S.C. 154(b) by 296 days.

(21) Appl. No.: 18/451,116

(22) Filed: Aug. 17, 2023

(65) Prior Publication Data

US 2024/0064478 A1 Feb. 22, 2024

(30) Foreign Application Priority Data

Aug. 22, 2022 (EP) .................................... 22191449

(51) Int. Cl.
*H04R 25/00* (2006.01)

(52) U.S. Cl.
CPC ....... *H04R 25/453* (2013.01); *H04R 2460/01* (2013.01)

(58) Field of Classification Search
CPC .......................... H04R 25/453; H04R 2460/01
See application file for complete search history.

(56) References Cited

U.S. PATENT DOCUMENTS

| | | | | |
|---|---|---|---|---|
| 10,419,838 | B1 | 9/2019 | Criswell et al. | |
| 2016/0073203 | A1 * | 3/2016 | Kuriger | H04R 3/005 381/23.1 |
| 2019/0088267 | A1 * | 3/2019 | Vilermo | H04R 27/00 |
| 2021/0021940 | A1 * | 1/2021 | Petersen | H04R 25/407 |
| 2021/0076124 | A1 * | 3/2021 | Hoang | G10K 11/17837 |
| 2021/0368254 | A1 * | 11/2021 | Kemmerer | G06F 3/16 |

FOREIGN PATENT DOCUMENTS

| | | |
|---|---|---|
| EP | 2765787 | 8/2014 |
| EP | 2884763 | 6/2015 |
| EP | 3998779 | 5/2022 |

* cited by examiner

*Primary Examiner* — Fan S Tsang
*Assistant Examiner* — Tyler Michael Liebgott

(57) ABSTRACT

Disclosed herein are embodiments of a hearing device including a multitude of input transducers providing a corresponding multitude of electric input signals, a noise reduction system comprising first and second beamformer filters configured to provide first and second beamformed signals, respectively, first and second noise reduction controllers configured to receive said multitude of electric input signals, and said first and second beamformed signals, respectively, and to provide respective first and second noise reduced signals, according to first and second adaptive selection schemes, respectively.

17 Claims, 11 Drawing Sheets

METHOD OF REDUCING WIND NOISE IN A HEARING DEVICE

TECHNICAL FIELD

The present applicant relates to the field of hearing devices, specifically to reduction of wind noise in hearing devices, e.g. hearing aids or headsets.

When an audio signal is available at multiple microphones of a wearable hearing device, e.g. a hearing aid or a headset, it is likely that one of the microphone signals contains less wind noise, and an efficient way of removing wind noise is thus to select the signal among the different candidates which contains the smallest amount of wind noise (measured as the instantaneous level in each time-frequency unit). This concept is described in EP2765787A1 and illustrated in FIG. 1.

FIG. 2 and FIG. 3 illustrates how the selection pattern may appear in the case of a sound scene without wind and a sound scene with wind, respectively. In the sound scene without wind, the beamformed signal will typically be the sound signal with the least amount of wind, but in the sound scene containing wind it becomes more likely that one of the microphone signals contain less wind compared to the linear combination between the microphones (BFU).

SUMMARY

In hearing instruments, the input sound may be processed simultaneously for multiple purposes. E.g. the input sound may be processed in order to enhance speech in noise, or the input sound may be processed in order to enhance the user's own voice. Own voice enhancement may be important during phone conversations or for picking up specific keyword commands or for wake-word detection. Reducing wind noise in such two parallel processing paths may become a computationally expensive solution, as each processing channel will require a separate wind noise reduction system, as illustrated in FIG. 4.

A First Hearing Device:

In an aspect of the present application, a hearing device comprising an earpiece adapted to be worn at an ear of a user is disclosed. The hearing device comprises

- an input stage comprising a multitude of input transducers for providing a corresponding multitude of electric input signals representing sound in an environment around the hearing device, each electric input signal being provided in a digitized form, and further in a time-frequency representation comprising a number of frequency bands k and a number of time instances m;
- a noise reduction system comprising
  - a first beamformer filter configured to receive said multitude of electric input signals and having a first sensitivity in a first spatial direction, and to provide a first beamformed signal;
  - a second beamformer filter configured to receive said multitude of electric input signals and having a second sensitivity in a second spatial direction, different from said first spatial direction, and to provide a second beamformed signal;
  - a first noise reduction controller configured to receive said multitude of electric input signals, or a signal or signals based thereon, and said first beamformed signal, or a signal based thereon,
  - a second noise reduction controller configured to receive said multitude of electric input signals, or a signal or signals based thereon, and said second beamformed signal, or a signal based thereon,
  - wherein the first and second noise reduction controller are configured to determine a first and a second noise reduced signal, or first and second noise reduction gains, respectively, according to first and second adaptive selection schemes, respectively,
  - wherein the first adaptive selection scheme either
    - is based on, such as is equal to, the second adaptive selection scheme, or
    - comprises that a given time-frequency bin (k,m) of the first noise reduced signal, or the first noise reduction gains, is determined from the content of the time-frequency bin (k,m) among said multitude of electric input signals and said first beamformed signals, or signals derived therefrom, comprising the least energy or having the smallest magnitude;
  - wherein the second adaptive selection scheme either
    - is based on, such as is equal to, the first adaptive selection scheme, or
    - comprises that a given time-frequency bin (k,m) of the second noise reduced signal, or the second noise reduction gains, is determined from the content of the time-frequency bin (k,m) among said multitude of electric input signals and said second beamformed signals, or signals derived therefrom, comprising the least energy or having the smallest magnitude;
- an output stage comprising at least one of
  - a first output transducer located in said earpiece and configured to provide output stimuli perceivable as sound to the user in dependence of said first noise reduced signal or gains, or a signal or signals or gains based thereon; and
  - a second output transducer comprising a transmitter for transmitting an audio signal provided in dependence of said second noise reduced signal or gains, or a signal or signals based thereon, to an external device; and
  - a keyword detector or a part thereof configured to receive said second noise reduced signal or gains, or a signal or signals based thereon.

Thereby an improved hearing device may be provided.

The noise reduction system may be particularly advantageous to reduce uncorrelated noise, e.g. wind noise.

The multitude of input transducers may be constituted by two or three input transducers, e.g. microphones. The multitude of input transducers may comprise three or more input transducers.

The noise reduction system (e.g. the noise reduction controller) may comprise other schemes for reducing other types of noise (e.g. from modulated noise from localized sound sources, e.g. a machine).

The hearing device may be constituted by or comprise a hearing aid or a headset, or a combination thereof.

The selection scheme (e.g. embedded in the noise reduction controller(s), also denoted 'selection block' and 'mixing and/or selection unit (MIX-SEL)' in the present disclosure) may e.g. be configured to provide noise reduction gains (instead of noise reduced signal(s)), where, for each of the different input signals to the selection block (denoted MIX-SEL, in FIG. 1-8, 10), a different gain is applied—as e.g. illustrated in FIGS. 2 and 3.

The third option of the output stage, connected to the noise reduction system, (in addition to either the first or the second option, or to both) may be an input stage to a keyword spotting system (KWS) comprising a keyword detector. The keyword detector may be configured to detect a keyword (or a part thereof) only when the user speaks the keyword (e.g. when the second noise reduced signal is the user's own voice), e.g. when the second beamformer filter comprises (fixed or adaptively updated) filter coefficients configured to steer a beamformer of the second beamformer filter towards the user's mouth.

The hearing device may further comprise other noise reduction means, e.g. a post filter for attenuating time frequency units assumed to contain predominantly noise more than time frequency units assumed to contain predominantly speech. Contrary to a selection gain, a post filter gain is applied after the selection block (i.e. after the noise reduction controller (MIX-SEL)), and we may hence regard a post filter gain contribution to be similar across the different inputs to the selection block.

The hearing device may further comprise an audio signal processor configured to apply one or more signal processing algorithms to the multitude of electric input signals of a signal or signals based thereon, e.g. the first or second beamformed signal or to the first or second noise reduced signals. The audio signal processor may be configured apply a frequency and level dependent gain to compensate for a hearing impairment of the user in a hearing aid, or to remove (further) noise from an input signal or a beamformed signal of a headset.

The first and second adaptive schemes may determine a selection scheme for the first and second noise reduced signals, respectively, wherein a given time-frequency bin (k,m) of the first and second noise reduced signal (or corresponding gains) is determined from the content of the time-frequency bin (k,m) among (at least one of) said multitude of electric input signals and said first and second beamformed signals, respectively, or signals derived therefrom, comprising the least energy or having the smallest magnitude. In other words, the first and second adaptive schemes will (individually) select a given time-frequency bin (k,m) from different 'source signals' (electric input signals and a first or second beamformed signal, or signals based thereon) for the first and second noise reduced signals. This has the advantage that each of the noise reduced signals are individually adapted (noise reduced), but at the cost of more processing complexity (e.g. larger power consumption). To reduce power consumption, one of the first and second adaptive selection schemes may be 'copied' from the other (to thereby reduce processing complexity). The choice of individual (independent) vs. common adaptive selection scheme may e.g. be controlled by a current mode of operation, and/or a sound environment classifier.

The (wind) noise reduction system according to the present disclosure may be activated in a specific mode of operation of the hearing device, e.g. in a specific program, e.g. related to a voice control interface, and/or to a communication ('headset' or 'telephone mode') mode of operation.

The output stage may comprise one or more synthesis filter banks for converting signals in the time-frequency domain to the time domain.

Instead of 'a keyword detector or a part thereof configured to receive said second noise reduced signal or gains, or a signal or signals based thereon', the output stage of the hearing device may comprise another detector for receiving said second noise reduced signal or gains, or a signal or signals based thereon, to provide an improved functionality of the hearing device or configured for being transmitted to another device or system.

The first beamformer filter may be configured to have a maximum sensitivity or a unit sensitivity in a direction of a target signal source in said environment to provide that the first beamformed signal comprises an estimate of the target signal. In other words, the first spatial direction may be a direction of a target signal (or interest to the user), and the first sensitivity may be a maximum sensitivity or a unit sensitivity. The target signal source may be a speaker in the environment of the hearing device (i.e. around the user, when the user wears the hearing device), e.g. in front of the user. The beamformer may have higher sensitivity towards other directions than a target direction, but it may have unit sensitivity (i.e. an unaltered response towards the target direction, where 'unaltered' means 'compared to a reference input transducer (e.g. a microphone)', e.g. among the input transducers of the hearing device). A maximum sensitivity is typically towards a specific direction (e.g. the front of the user) partly determined by the physical placement of the microphones, as well as the acoustic field around the microphone array (such as the acoustic properties of a head and torso). The first spatial direction of the first beamformer filter may be a direction of a target sound source (of interest to the user) in an environment of the user, and the first beamformed signal may be an estimate of the target sound source.

The maximum sensitivity of a beamformer depends on the configuration of the microphone array providing the input signals to the beamformer. The desired target direction is not necessarily the direction with maximum sensitivity. It is typically easier to make a beamformer, which has minimum sensitivity towards the desired target direction, and to use this in a generalized sidelobe cancelling (GSC) type beamformer structure in order to ensure that the target signal distortion is minimized.

The second beamformer filter may e.g. be configured to fulfil a minimum distortion criterion towards the target sound source (e.g. in the target direction, e.g. a direction of the user's mouth). The second beamformer filter may e.g. be configured to have a maximum sensitivity in a direction of the user's mouth to provide that the second beamformed signal comprises the user's voice when the user is vocally active. In other words, the second spatial direction may be a direction of the user's mouth, and the second sensitivity may be a maximum sensitivity of the beamformer. Alternatively, the second beamformer filter may be configured to have unit sensitivity in a direction of the user's mouth. The second beamformed signal may comprise an estimate of the user's voice (the user being vocally active or not). The second spatial direction of the second beamformer filter may be a direction of the user's mouth and the second beamformed signal may be an estimate of the user's own voice.

In the examples of the present disclosure, the second beamformer filter is implemented as an own voice beamformer, which is useful in several applications of a state-of-the art hearing aid, e.g. in a telephone- ('headset'-) mode or in connection with a voice control interface, where a keyword detector for identifying one or more keywords or key-phrases when spoken by the user is implemented. In both cases an estimate of the user's voice is needed. However, in other applications, any speech signal may be relevant, e.g. a voice of a particular person, or a voice spoken from a specific position relative t the user. Further, any speech signal may be relevant in other hearing devices, e.g. a table microphone for picking up voice signals from a multitude of directions around it. In other words, the second spatial direction, different from said first spatial direction, may be a direction to the user's mouth, but may alternatively by any direction (different from the first direction) of interest to the user (or to implement an application in hearing aid).

The output stage may comprise a separate synthesis filter bank for each of the at least one output transducers.

The output stage may comprise the first and/or second output transducers.

The input stage may comprise a separate analysis filter bank for each of the multitude of input transducers.

The keyword detector may be configured to detect a specific word or combination of words when spoken by the user (of the hearing device), wherein the keyword detector is connected to the second beamformer filter. The keyword detector may be configured to receive the second beamformed signal (comprising an estimate of the user's voice). The hearing device may comprise a voice control interface for controlling functionality of the hearing device based on spoken commands. The keyword detector may form part of or provide inputs to the voice control interface. The keyword detector may form part of the output stage (and be connected to the noise reduction system). The keyword detector may form part of a keyword spotting system.

The hearing device may comprise a transceiver, including the transmitter of the second output transducer and may further comprise a receiver, configured to allow an audio communication link to be established between the hearing device and the external device. The transceiver may be configured to support a wireless audio link to be established. The external device may e.g. be or comprise a communication device, e.g. a telephone (e.g. of the user). Thereby a telephone conversation established between the communication device and a far-end communication partner, e.g. in a specific communication mode of operation of the hearing device, may be extended from the communication device to the hearing device. In this mode of operation, the estimate of the user's voice (the second beamformed signal, or a further processed version thereof) is transmitted to the communication device (and from there to the far-end communication partner). Further, the voice of the far-end communication partner is transmitted from the communication device to the hearing device and presented to the user via a receiver and the first output transducer (possibly together with a (possibly attenuated) signal dependent on at least one (e.g. all) of said multitude of electric input signals, e.g. a processed (e.g. noise reduced), and/or attenuated version thereof).

The first noise reduction controller may be configured to control the determination of the first as well as the second noise reduced signal. The second adaptive selection scheme may be equal to the first adaptive selection scheme. The second noise reduction controller may hence be configured to use the same adaptive selection scheme determined for the first noise reduced signal to provide the second noise reduced signal. The first noise reduction controller may e.g. be configured to receive at least one (such as all) of the multitude of electric input signals, or signals originating therefrom, and the first beamformed signal, or a signal originating therefrom, and determine the first noise reduced signal based thereon according to the first adaptive selection scheme. In other words, the adaptive selection scheme is dependent on the first beamformed signal but used for determining the second noise reduced signal.

Conversely, the first noise reduction controller may be configured to use the same adaptive selection scheme determined for the second noise reduced signal to provide the first noise reduced signal. The second noise reduction controller may be configured to receive at least one (such as all) of the multitude of electric input signals, or signals based thereon, and the second beamformed signal, or a signal based thereon, and determine the second noise reduced signal based thereon according to the second adaptive selection scheme. The second adaptive selection scheme may be dependent on the second beamformed signal but used for determining the first noise reduced signal. The first adaptive selection scheme may be equal to the second adaptive selection scheme (influenced by the second beamformed signal).

The hearing device (e.g. the first noise reduction controller) may be configured to dynamically switch between which of the first and second beamformed signals to include in the determination of the first and second noise reduced signals. A control signal for such switching may include an own voice detection signal. The selected program may as well be used to determine the input signal, e.g. in a phone program, we may use the second beamformer branch, where a user's voice is estimated (so the own voice beamformer may be used to determine at least the second noise reduced signal).

The hearing device may be configured to provide that the first and/or second noise reduction controllers are activated (or deactivated) in dependence of battery power. If, e.g., a battery level of the hearing device is below a first threshold value, the wind noise reduction processing is only applied in one of the processing branches. If, e.g., the battery level is below a second threshold value, the wind noise reduction processing may be dispensed with entirely. So, in case the first and/or second noise reduction controllers are NOT activated, the first and/or second noise reduced signal (or first and/or second noise reduction gains), respectively, are not determined (and hence not provided as, or applied to, the first and/or second beamformed signals, respectively.

The hearing device may be constituted by or comprise at least one earpiece (e.g. two) and a separate processing device, wherein the at least one earpiece and the separate processing device are configured to allow an audio communication link to be established between them.

The at least one earpiece may comprise at least one of the multitude of input transducers for providing a corresponding multitude of electric input signals representing sound in an environment around the hearing device, and the first output transducer. The separate processing device may comprise at least a part of the noise reduction system. The separate processing device may comprise an audio signal processor configured to apply one or more signal processing algorithms to the multitude of electric input signals of a signal or signals based thereon, e.g. to the first and/or second beamformed signal or to the first and/or second noise reduced signals. The audio signal processor may be configured to apply a frequency and level dependent gain to compensate for a hearing impairment of the user, and/or to remove noise from an input signal.

The hearing device may be constituted by or comprise a hearing aid or a headset or an earphone or an active ear protection device, or a combination thereof. The hearing aid may comprise (or be constituted by) an air-conduction type hearing aid, a bone-conduction type hearing aid, a cochlear implant type hearing aid, or a combination thereof.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing device may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid). The output unit may (additionally or alternatively) comprise a transmitter for transmitting sound picked up-by the hearing device to another device, e.g. a far-end communication partner (e.g. via a network, e.g. in a telephone mode of operation, or in a headset configuration).

The hearing device may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound.

The wireless receiver and/or transmitter may e.g. be configured to receive and/or transmit an electromagnetic signal in the radio frequency range (3 kHz to 300 GHz). The wireless receiver and/or transmitter may e.g. be configured to receive and/or transmit an electromagnetic signal in a frequency range of light (e.g. infrared light 300 GHz to 430 THz, or visible light, e.g. 430 THz to 770 THz).

The hearing aid may comprise a directional microphone system adapted to spatially filter sounds from the environment, and thereby enhance a target acoustic source among a multitude of acoustic sources in the local environment of the user wearing the hearing device. The directional system may be adapted to detect (such as adaptively detect) from which direction a particular part of the microphone signal originates. This can be achieved in various different ways as e.g. described in the prior art. In hearing devices, a microphone array beamformer is often used for spatially attenuating background noise sources. The beamformer may comprise a linear constraint minimum variance (LCMV) beamformer. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing device may comprise antenna and transceiver circuitry allowing a wireless link to an entertainment device (e.g. a TV-set), a communication device (e.g. a telephone), a wireless microphone, or another hearing device, etc. The hearing device may thus be configured to wirelessly receive a direct electric input signal from another device. Likewise, the hearing device may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing device can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing device and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology), or Ultra WideBand (UWB) technology.

The hearing device may be or form part of a portable (i.e. configured to be wearable) device, e.g. a device comprising a local energy source, e.g. a battery, e.g. a rechargeable battery. The hearing device may e.g. be a low weight, easily wearable, device, e.g. having a total weight less than 100 g, such as less than 20 g, such as less than 5 g.

The hearing device may comprise a 'forward' (or 'signal') path for processing an audio signal between an input and an output of the hearing device. A signal processor may be located in the forward path. The signal processor may be adapted to provide a frequency dependent gain according to a user's particular needs (e.g. hearing impairment). The hearing device may comprise an 'analysis' path comprising functional components for analyzing signals and/or controlling processing of the forward path. Some or all signal processing of the analysis path and/or the forward path may be conducted in the frequency domain, in which case the hearing device comprises appropriate analysis and synthesis filter banks. Some or all signal processing of the analysis path and/or the forward path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing device may comprise an analogue-to-digital (AD) converter to digitize an analogue input (e.g. from an input transducer, such as a microphone) with a predefined sampling rate, e.g. 20 kHz. The hearing device may comprise a digital-to-analogue (DA) converter to convert a digital signal to an analogue output signal, e.g. for being presented to a user via an output transducer.

The hearing device, e.g. the input unit, and or the antenna and transceiver circuitry may comprise a transform unit for converting a time domain signal to a signal in the transform domain (e g frequency domain or Laplace domain, Z transform, wavelet transform, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g. a Discrete Fourier Transform (DFT) algorithm, or a Short Time Fourier Transform (STFT) algorithm, or similar) for converting a time variant input signal to a (time variant) signal in the (time-)frequency domain. The frequency range considered by the hearing device from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing device may be split into a number NI of frequency bands (e.g. of uniform width), where NI is e.g. larger than 5, such as larger than 10, such as larger than 50, such as larger than 100, such as larger than 500, at least some of which are processed individually. The hearing device may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing device may be configured to operate in different modes, e.g. a normal mode and one or more specific modes, e.g. selectable by a user, or automatically selectable. A mode of operation may be optimized to a specific acoustic situation or environment, e.g. a communication mode, such as a telephone mode. A mode of operation may include a low-power mode, where functionality of the hearing device is reduced (e.g. to save power), e.g. to disable wireless communication, and/or to disable specific features of the hearing device, e.g. to disable independent (wind) noise reduction according to the present disclosure.

The hearing device may comprise a number of detectors configured to provide status signals relating to a current physical environment of the hearing device (e.g. the current acoustic environment), and/or to a current state of the user wearing the hearing device, and/or to a current state or mode of operation of the hearing device. Alternatively, or additionally, one or more detectors may form part of an external device in communication (e.g. wirelessly) with the hearing device. An external device may e.g. comprise another hearing device, a remote control, and audio delivery device, a telephone (e.g. a smartphone), an external sensor, etc.

One or more of the number of detectors may operate on the full band signal (time domain) One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain) The level detector operates on band split signals ((time-) frequency domain).

The number of detectors may comprise a correlation detector for detecting a corelation between two signals of the hearing device.

The hearing device may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing device may comprise an own voice detector for estimating whether or not (or with what probability) a given input sound (e.g. a voice, e.g. speech) originates from the voice of the user of the system. A microphone system of the hearing device may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing device may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing device, or other properties of the current environment than acoustic);
b) the current acoustic situation (input level, feedback, etc.), and
c) the current mode or state of the user (movement, temperature, cognitive load, etc.);
d) the current mode or state of the hearing device (program selected, time elapsed since last user interaction, etc.) and/or of another device in communication with the hearing device.

The classification unit may be based on or comprise a neural network, e.g. a recurrent neural network, e.g. a trained neural network.

The hearing device may comprise an acoustic (and/or mechanical) feedback control (e.g. suppression) or echo-cancelling system. Adaptive feedback cancellation has the ability to track feedback path changes over time. It is typically based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing device may further comprise other relevant functionality for the application in question, e.g. compression, noise reduction, etc.

The hearing device may comprise a hearing aid, e.g. a hearing instrument, e.g. a hearing instrument adapted for being located at the ear or fully or partially in the ear canal of a user, a headset, an earphone, an ear protection device or a combination thereof. A hearing system may comprise a speakerphone (comprising a number of input transducers (e.g. a microphone array) and a number of output transducers, e.g. one or more loudspeakers, and one or more audio (and possibly video) transmitters e.g. for use in an audio conference situation), e.g. comprising a beamformer filtering unit, e.g. providing multiple beamforming capabilities.

A Second Hearing Device:

In an aspect of the present disclosure, a second hearing device comprising an earpiece adapted to be worn at an ear of a user I provided. The hearing device comprisins:

- an input stage comprising a multitude of input transducers for providing a corresponding multitude of electric input signals representing sound in an environment around the hearing device, each electric input signal being provided in a digitized form, and further in a time-frequency representation comprising a number of frequency bands k and a number of time instances m;
- a noise reduction system comprising
  - a first beamformer filter configured to receive said multitude of electric input signals and having a first sensitivity in a first spatial direction, and to provide a first beamformed signal;
  - a second beamformer filter configured to receive said multitude of electric input signals and having a second sensitivity in a second spatial direction, different from said first spatial direction, and to provide a second beamformed signal;
  - a first noise reduction controller configured to receive said multitude of electric input signals, or a signal or signals based thereon, and said first beamformed signal, or a signal based thereon,
  - a second noise reduction controller configured to receive said multitude of electric input signals, or a signal or signals based thereon, and said second beamformed signal, or a signal based thereon,
  - wherein the first and second noise reduction controller are configured to determine a first and a second noise reduced signal, or first and second noise reduction gains, respectively, according to first and second adaptive selection schemes, respectively,
    - wherein the first adaptive selection scheme comprises that a given time-frequency bin (k,m) of the first noise reduced signal, or the first noise reduction gains, is determined from the content of the time-frequency bin (k,m) among said multitude of electric input signals and said first beamformed signal, or signals derived therefrom, comprising the least energy or having the smallest magnitude;
    - wherein the second adaptive selection scheme comprises that a given time-frequency bin (k,m) of the second noise reduced signal, or the second noise reduction gains, is determined from the content of the time-frequency bin (k,m) among said multitude of electric input signals and said second beamformed signal, or signals derived therefrom, comprising the least energy or having the smallest magnitude;
- an output stage comprising at least one of
  - a first output transducer located in said earpiece and configured to provide output stimuli perceivable as sound to the user in dependence of said first noise reduced signal or gains, or a signal or signals or gains based thereon; and
  - a second output transducer comprising a transmitter for transmitting an audio signal provided in dependence of said second noise reduced signal or gains, or a signal or signals based thereon, to an external device; and
  - a keyword detector or a part thereof configured to receive said second noise reduced signal or gains, or a signal or signals based thereon.

The features of a hearing aid outlined above, in the detailed description of embodiments and in the claims are intended to be combinable with the second hearing device as defined above.

Use:

In an aspect, use of a hearing device, e.g. a hearing aid, as described above, in the 'detailed description of embodiments' and in the claims, is moreover provided. Use may be provided in a system comprising one or more hearing aids or a hearing system (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, a method of operating a hearing device comprising an earpiece adapted to be worn at an ear of a user is provided. The method comprises

- providing a multitude of electric input signals representing sound in an environment around the hearing device, each electric input signal being provided in a digitized form, and further in a time-frequency representation comprising a number of frequency bands k and a number of time instances m;
- providing noise reduction by
  - providing a first beamformed signal by a first beamformer filter based on said multitude of electric input signals, the first beamformer filter having a first sensitivity in a first spatial direction;
  - providing a second beamformed signal by a second beamformer filter based on said multitude of electric input signals, the second beamformer filter having a second sensitivity in a second spatial direction, different from said first spatial direction;
  - determining a first noise reduced signal, or first noise reduction gains, respectively, according to a first adaptive selection scheme, in dependence of said multitude of electric input signals, or a signal or signals based thereon, and said first beamformed signal, or a signal based thereon;
  - determining a second noise reduced signal, or second noise reduction gains, according to a second adaptive selection scheme, in dependence of said multitude of electric input signals, or a signal or signals based thereon, and said second beamformed signal, or a signal based thereon;
  - wherein the first adaptive selection scheme either
    - is based on, such as is equal to, the second adaptive selection scheme, or
    - comprises that a given time-frequency bin (k,m) of the first noise reduced signal, or the first noise reduction gains, is determined from the content of the time-frequency bin (k,m) among said multitude of electric input signals and said first beamformed signals, or signals derived therefrom, comprising the least energy or having the smallest magnitude;
  - wherein the second adaptive selection scheme either
    - is based on, such as is equal to, the first adaptive selection scheme, or comprises that a given time-frequency bin (k,m) of the second noise reduced signal, or the second noise reduction gains, is determined from the content of the time-frequency bin (k,m) among said multitude of electric input signals and said second beamformed signals, or signals derived therefrom, comprising the least energy or having the smallest magnitude; and at least one of in said earpiece providing output stimuli perceivable as sound to the user in dependence of said first noise reduced signal or gains, or a signal or signals or gains based thereon; and transmitting an audio signal provided in dependence of said second noise reduced signal or gains, or a signal or signals based thereon, to an external device; and detecting a keyword or a part thereof in dependence of said second noise reduced signal or gains, or a signal or signals based thereon.

It is intended that some or all of the structural features of the system described above, in the 'detailed description of embodiments' or in the claims can be combined with embodiments of the method, when appropriately substituted by a corresponding process and vice versa. Embodiments of the method have the same advantages as the corresponding systems.

The method may be configured to detect the keyword (or a part thereof) only when the user speaks the keyword (e.g. when the second noise reduced signal is the user's own voice), e.g. when the second beamformer filter comprises (fixed or adaptively updated) filter coefficients configured to steer the a beamformer of the second beamformer filter towards the user's mouth.

Instead of 'detecting a keyword or a part thereof in dependence of said second noise reduced signal or gains, or a signal or signals based thereon', the method may comprise a step of processing said second noise reduced signal or gains, or a signal or signals based thereon to provide an improved functionality of the hearing device.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing device, e.g. a hearing aid, as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other. The auxiliary device may be constituted by or comprise a separate audio processing device. The hearing system may be configured to perform the processing, e.g. noise reduction, according to the present disclosure, fully or partially in the separate audio processing device, cf. e.g. FIG. 9B.

The auxiliary device may be constituted by or comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC, a wireless microphone, etc.) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system.

Embodiments of the disclosure may e.g. be useful in body-worn audio applications configured to pick up sound in various environments (e.g. outside) and to present processed sound a user based on such environment sound, e.g. devices such as hearing aids or headsets or earphones or active ear protection devices.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing devices, e.g. hearing aids or headsets.

Figure 1:
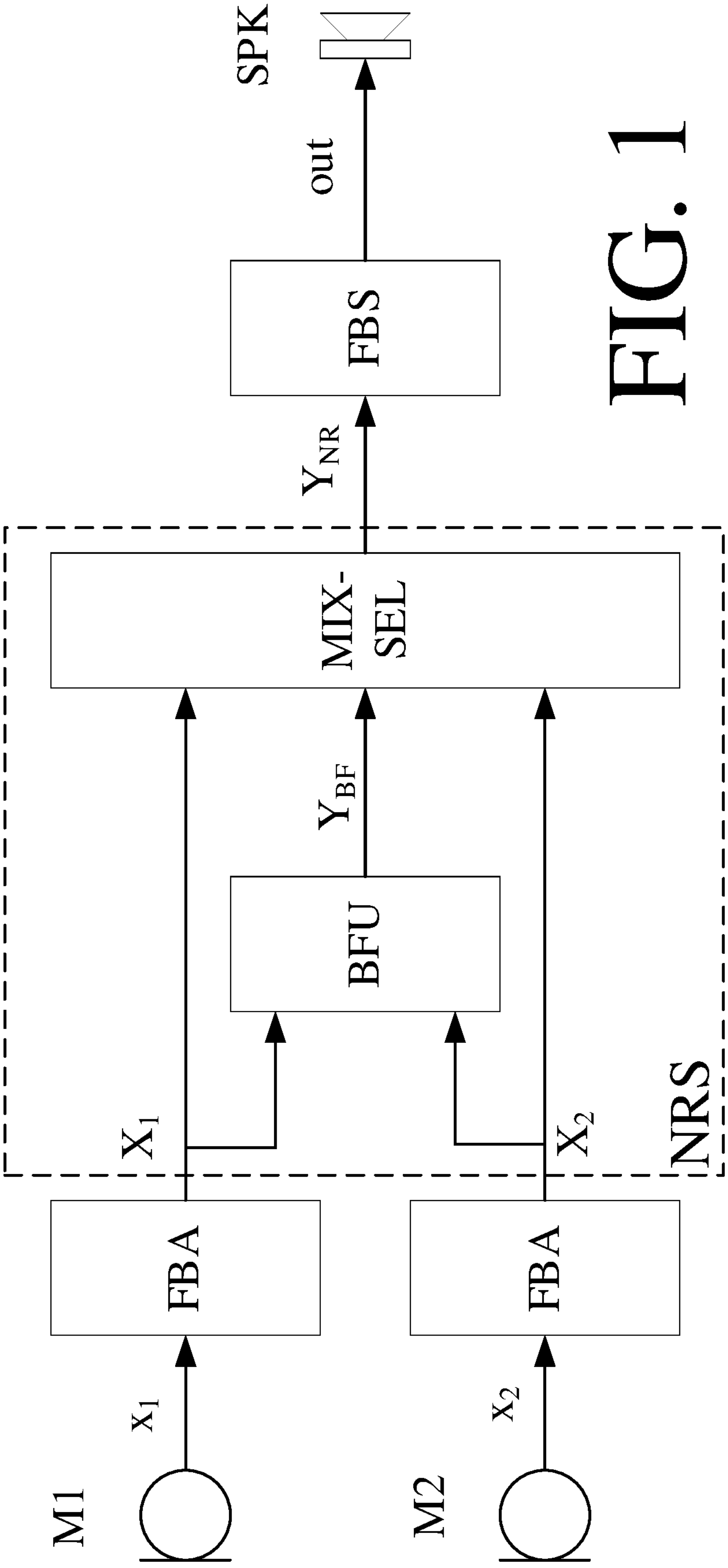
FIG. 1 schematically shows a prior art wind noise reduction system.
Figure 2:
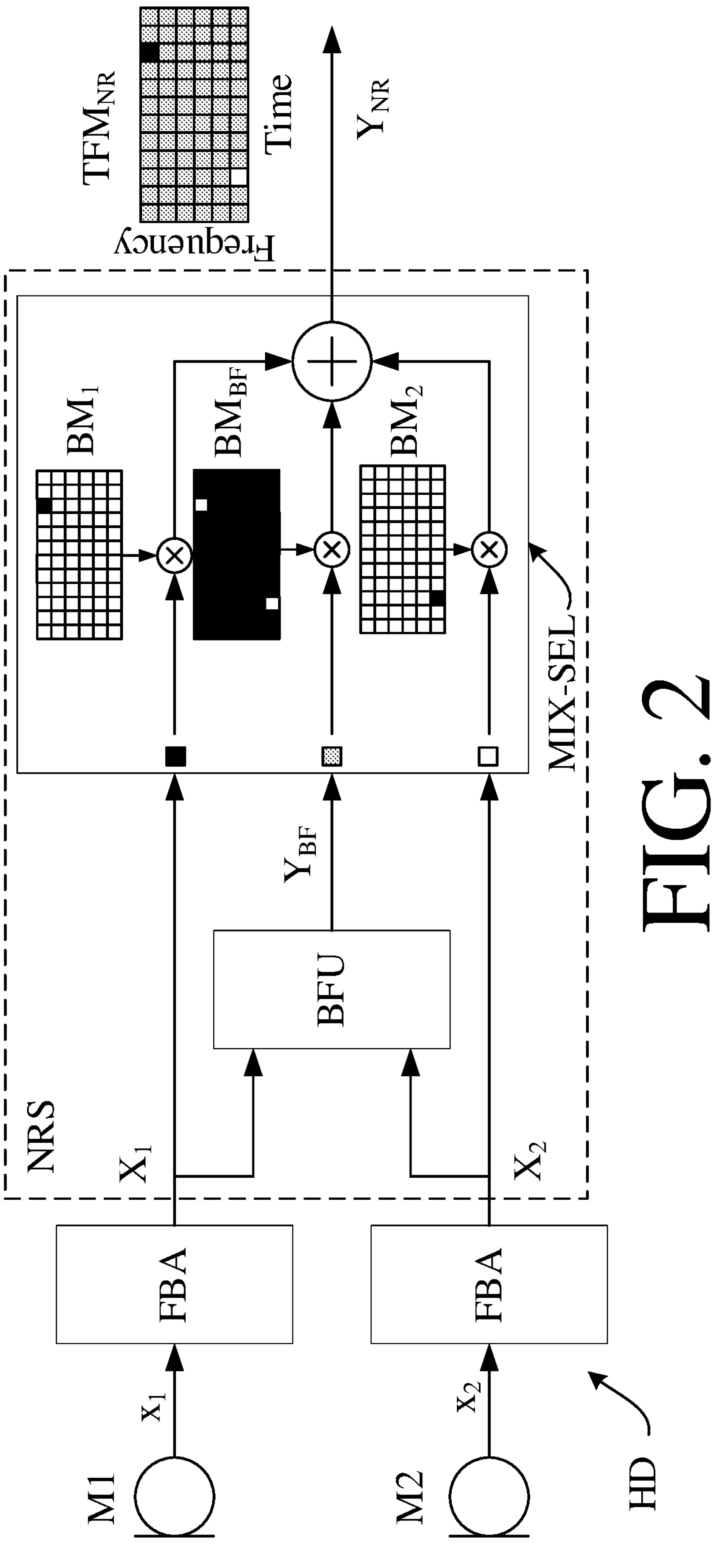
FIG. 2 schematically illustrates a first selection pattern during normal use of the system of FIG. 1, FIG. 3 schematically illustrates a second selection pattern when wind is present.
Figure 3:
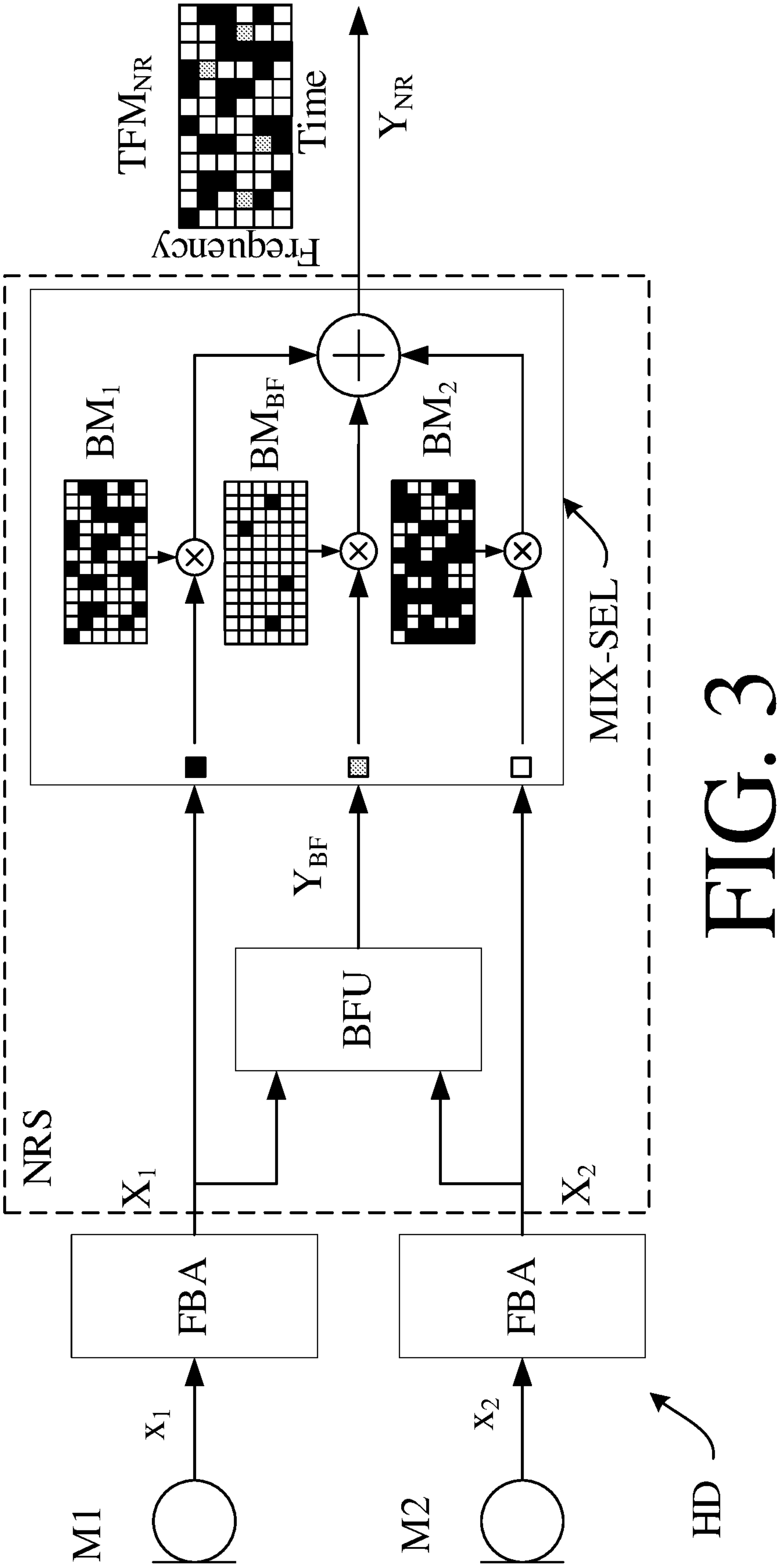

FIG. 1 shows a prior art wind noise reduction system. FIG. 1 shows a hearing system, e.g. a hearing device, such as a hearing aid or a headset, comprising two microphones ($M_1$, $M_2$) each providing an (time-domain) electric input signal ($x_1$, $x_2$). The hearing device comprises an audio signal path comprising the wind noise reduction system (NRS) and an output transducer (SPK), here a loudspeaker for converting a processed signal (out) to output stimuli (here vibrations in air) perceivable as sound to a user of the hearing device. The audio signal path comprises a filter bank comprising respective analysis (FBA) and synthesis (FBS) filter banks allowing processing to be conducted in the (time-) frequency domain based on time (m) and frequency (k) dependent sub-band signals ($X_1$, $X_2$, $Y_{BF}$, $Y_{NR}$). The wind noise reduction system (NRS) comprises a beamformer filter (BFU) configured to provide a beamformed signal ($Y_{BF}$) in dependence of the electric input signals ($X_1$, $X_2$) and fixed or adaptively updated (typically complex) beamformer weights ($w_i$), i=1,2). The wind noise reduction system (NRS) further comprises a mixing and/or selection unit (MIX-SEL), also termed 'noise reduction controller' in the present application, configured to provide a noise reduced signal ($Y_{NR}$) at least providing a signal with reduced wind noise (relative to the electric input signals ($X_1$, $X_2$)). For each unit in time and in frequency, termed 'time-frequency-unit', TF, or (m,k), the output signal ($Y_{NR}$) is selected among at least two microphone signals ($X_1$, $X_2$) and at least one linear combination ($Y_{BF}$) between the microphone signals (provided by the beamformer filter (BFU)). One selection criterion may be to select the signal among the different candidates which has the least amount of energy. This idea is e.g. described in EP2765787A1. The output signal ($Y_{NR}$) thus becomes a patchwork of selected time-frequency units created from the combination of the at least three input signals to the mixing and/or selection unit (MIX-SEL), as illustrated in the examples of FIGS. 2 and 3. In the embodiment of FIG. 1, the noise reduced signal ($Y_{NR}$) is fed to a synthesis filter bank (FBS) for converting the frequency domain signal ($Y_{NR}$) to a time-domain signal (out). A frequency domain signal (Z) of the forward path between the analysis and synthesis filter banks (FBA, FBS) comprise a number K of frequency sub-band signals (k=1, . . . , K), wherein a given frequency sub-band signal (at frequency k=k') comprises a (possibly complex) value Z(k', m') at a given time instant (m'), Z(k', m') representing the value of the signal Z in the time-frequency unit (k', m'). The time-domain signal (out) is fed to an output transducer (here a loudspeaker (SPK)) for being presented to the user as stimuli perceivable as sound.

FIG. 2 schematically illustrates a first selection pattern during normal use of the system of FIG. 1. In the exemplary normal scenario of FIG. 2 (where no significant amount of wind noise is assumed to be present), the beamformed signal ($Y_{BF}$) will typically contain the smallest amount of noise and it is thus selected in the vast majority of the time-frequency units (cf. time-frequency (TF) 'map' ($TFM_{NR}$) above the noise reduced output signal ($Y_{NR}$) of the mixing and/or selection unit (MIX-SEL) in FIG. 2.

The mixing and/or selection unit (MIX-SEL) comprises respective multiplication units ('x') each receiving one of the input signals ($X_1$, $X_2$, $Y_{BF}$) and configured to apply a specific 'binary mask' ($BM_1$, $BM_2$, $BM_{BF}$) to the respective input signal ($X_1$, $X_2$, $Y_{BF}$), cf. the three binary masks comprising black and white TF-units indicated as inputs to the respective multiplication units ('x'). In the binary masks, black and white may e.g. indicate 1 and 0, respectively. The black-grey-white TF-map ($TFM_{NR}$) in the right part of FIG. 2 (and FIG. 3) illustrates the output of the selection block (MIX-SEL), e.g. interpreted as the origin of a given TF-unit in the noise reduced signal ($Y_{NR}$). Black TF-units are assigned to electric input signal $X_1$ from microphone $M_1$, grey TF-units are assigned to beamformed signal $Y_{BF}$ from beamformer filter BFU, and white TF-units are assigned to electric input signal $X_2$ from microphone $M_2$. The three black and white beampatterns show three binary masks where the black areas indicate the selection of each of the three input signals ($X_1$, $X_2$, $Y_{BF}$), respectively. The output signal ($Y_{NR}$) of the mixing and/or selection unit (MIX-SEL) may thus be constructed by $$Y_{NR}=BM_1*X_1+BM_{BF}*Y_{BF}BM_2*X_2,$$

as indicated in FIG. 2 (and FIG. 3) by the sum unit ('+') connected to the outputs of the three multiplication units ('x').

In the schematic illustration of binary TF-masks ($BM_1$, $BM_2$, $BM_{BF}$) and TF-map ($TFM_{NR}$), illustrating frequency (k) and time (m) along the vertical and horizontal axes, respectively, the number of frequency bands is six. Any other number of frequency bands may be used, e.g. 4 or 8 or 16 or 64, etc.

FIG. 3 shows schematically illustrates a second selection pattern when wind is present. The beamformed signal is not necessarily the candidate which contains the smallest amount of noise. The function of the mixing and/or selection unit (MIX-SEL) in FIG. 3 is the same as described in connection with FIG. 2, only the input signals ($X_1$, $X_2$) are different resulting in different binary masks ($BM_1$, $BM_2$, $BM_{BF}$) (as illustrated) and hence different noise reduction in the noise reduced signal ($Y_{NR}$) (due to different origins of the time frequency units (see, $TFM_{NR}$) of the noise reduced signal).

Figure 4:
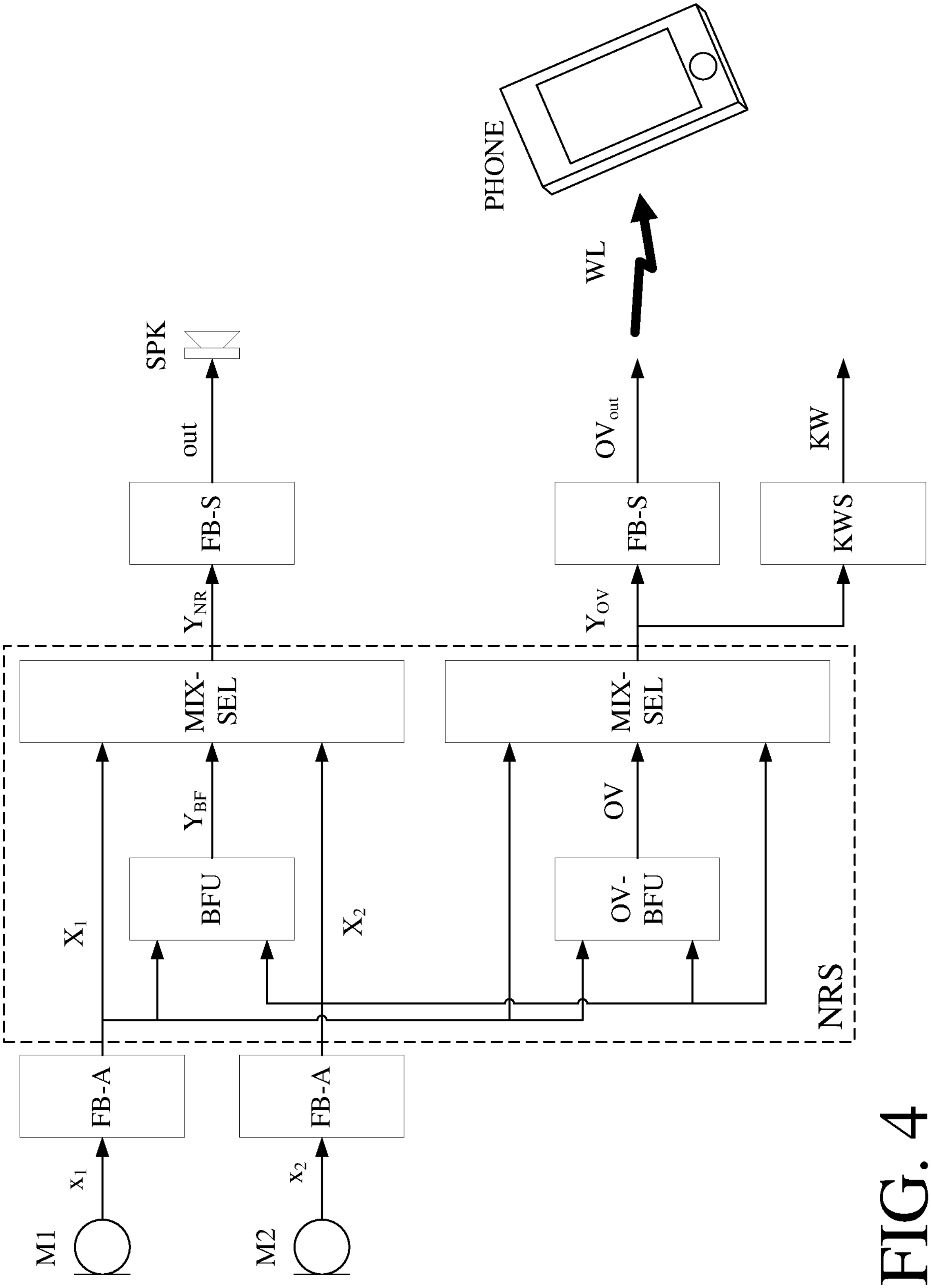
FIG. 4 shows a first embodiment of a hearing device according to the present disclosure.

FIG. 4 shows a first embodiment of a hearing device according to the present disclosure. The first embodiment of a hearing device comprises a first embodiment of a noise reduction system (cf. dashed enclosure denoted 'NRS' in FIG. 4) according to the present disclosure. The audio signal path of the embodiment of FIG. 4 is identical to the embodiment of FIG. 1. The (first) beamformer filter (BFU) of the (first) audio signal path may e.g. exhibit a preferred direction towards a target sound source in an environment of the user, to provide that the first beamformed signal ($Y_{BF}$) is an estimate of a signal from the target sound source, e.g. a speaker, such as a communication partner, in the environment.

The embodiment of FIG. 4, however, further comprises a second audio signal path from the input transducers to a second output transducer and/or to a voice control interface and/or to a keyword detector. The second audio signal path comprises a further (second) beamformer filter in the form of an own voice beamformer filter (OV-BFU) configured to provide an estimate (OV) of the user's voice in dependence of the electric input signals ($X_1$, $X_2$) and (fixed or adaptively updated beamformer weights) configured to focus a beam of the beamformer filter (OV-BFU) on the mouth of the user. The second audio signal path further comprises as separate mixing and/or selection unit (MIX-SEL2, where the mixing and/or selection unit of the first audio path is denoted MIX-SEL1). The separate (second) mixing and/or selection unit (MIX-SEL2) of the second audio path functions as described in connection with FIG. 1 in connection with the mixing and/or selection unit of the first audio path (MIX-SEL1), except that the second mixing and/or selection unit (MIX-SEL2) receives the beamformed signal (OV) of the second beamformer filter (OV-BFU) (instead of the beamformed signal ($Y_{BF}$) the first beamformer filter (BFU)). The (second) mixing and/or selection unit (MIX-SEL2) (=second noise reduction controller) provides a second noise reduced signal ($Y_{OV}$), which is a (wind) noise reduced version of the input signals ($X_1$, $X_2$, OV) of the (second) mixing and/or selection unit (MIX-SEL2) according to a second adaptive selection scheme. The second adaptive selection scheme is equal to the first adaptive selection scheme apart from the input signals being different ($Y_{BF}\neq$OV). The second adaptive selection scheme comprises that a given time-frequency bin (k,m) of the second noise reduced signal ($Y_{OV}$), or the second noise reduction gains ($G_{OV}$), is determined from the content of the time-frequency bin (k,m) among said multitude of electric input signals ($X_1$, $X_2$) and said second beamformed signals (OV), or signals derived therefrom, comprising the least energy or having the smallest magnitude.

The second noise reduced signal ($Y_{OV}$) is fed to a synthesis filter bank (FBS) for converting signals in the time-frequency domain (e.g. the second noise reduced signal, $Y_{OV}$) to the time domain (cf. signal $OV_{out}$ in FIG. 4). The time-domain signal ($OV_{out}$) representing the user's own voice is transmitted to another device, e.g. a telephone (PHONE) via a (e.g. wireless) communication link (WL) (the hearing system comprising appropriate antenna and transmission circuitry for establishing the link). The second noise reduced signal ($Y_{OV}$) is further fed to a keyword spotting system (KWS) comprising a keyword detector. The keyword spotting system (KWS) may form part of a voice control interface (VCI) of the hearing system, e.g. configured to allow the user of the hearing system to control functionality of the system. The keyword detector may e.g. be configured to detect a keyword (or a part thereof) only when the user speaks the keyword (e.g. when the second noise reduced signal is the user's own voice). A detected keyword (KW) from the keyword spotting system (KWS) may (alternatively, or additionally) be transmitted to an external device or system for being verified or for being executed as command there (e.g. in a smartphone, e.g. 'PHONE' in FIG. 4), e.g. via a wireless audio link (e.g. 'WL' in FIG. 4).

The solution of FIG. 4 is, however, computationally expensive. Each processing channel (=first and second audio signal path, one for speech enhancement for the user, and one for enhancement of the user's own voice) has its own wind noise reduction system (MIX-SEL1, MIX-SEL2, respectively) based on selecting of the signal with the least amount of energy or lowest magnitude. The first audio processing path may—in a specific communication mode—comprise an audio input from another person (e.g. a far-end talker of a telephone conversation). The (wind) noise reduction performed by the first mixing and/or selection unit (MIX-SEL1) in the first audio processing path may work on the input signals ($X_1$, $X_2$, $Y_{BF}$) from the acoustic to electric input transducers of the hearing system (or processed versions thereof).

Figure 5:
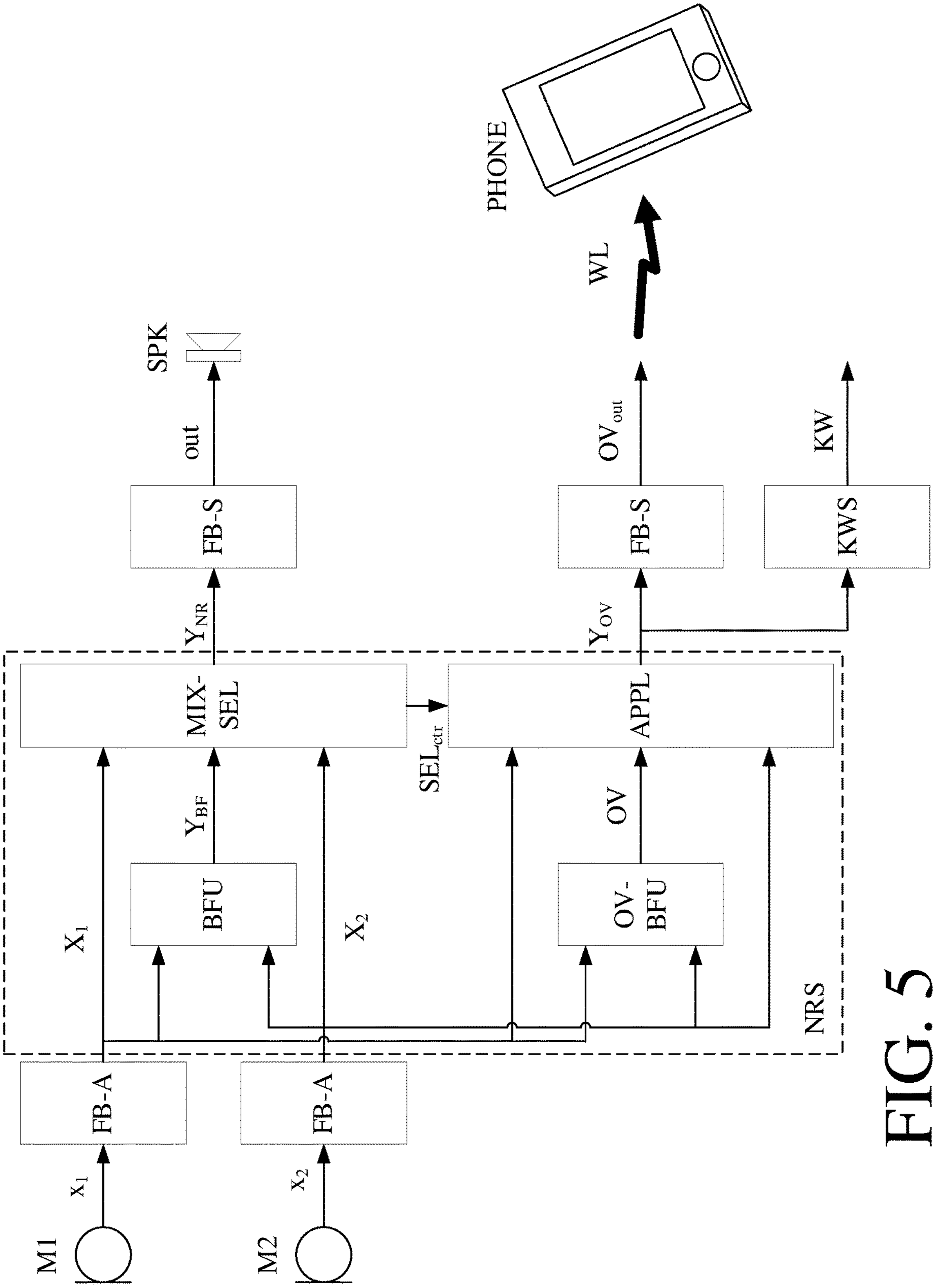
FIG. 5 shows a second embodiment of a hearing device according to the present disclosure.

FIG. 5 shows a second embodiment of a hearing device according to the present disclosure. The second embodiment of a hearing device comprises a second embodiment of a noise reduction system (cf. dashed enclosure denoted 'NRS' in FIG. 5) according to the present disclosure. The solution of FIG. 5 is similar to the embodiment of FIG. 4, but computationally less expensive than the solution of FIG. 4. The decision from the (environment) beamformer (BFU) branch (first audio signal path) is reused in the own voice beamformer (OV-BFU) branch (second audio signal path), cf. arrow indicating a selection control signal (denoted $SEL_{ctr}$) from the first (MIX-SEL) to the second (APPL) mixing and/or selection unit. The second mixing and/or selection unit is here denoted 'APPL' to indicate that it provides a passive application of the selection scheme created on the basis of the input signals ($X_1$, $X_2$, $Y_{BF}$) to the first mixing and/or selection unit (MIX-SEL). In other words, whenever, e.g., the BFU signal is selected in the BFU branch (first audio signal path), the own voice enhanced (OV-BFU) signal is selected in the own voice enhancement processing branch (second audio signal path) using the same selection strategy in the two audio paths. Hereby computations are saved, as only one (independent) mixing and/or selection unit (MIX-SEL, in the first audio signal path) is required.

Figure 6:
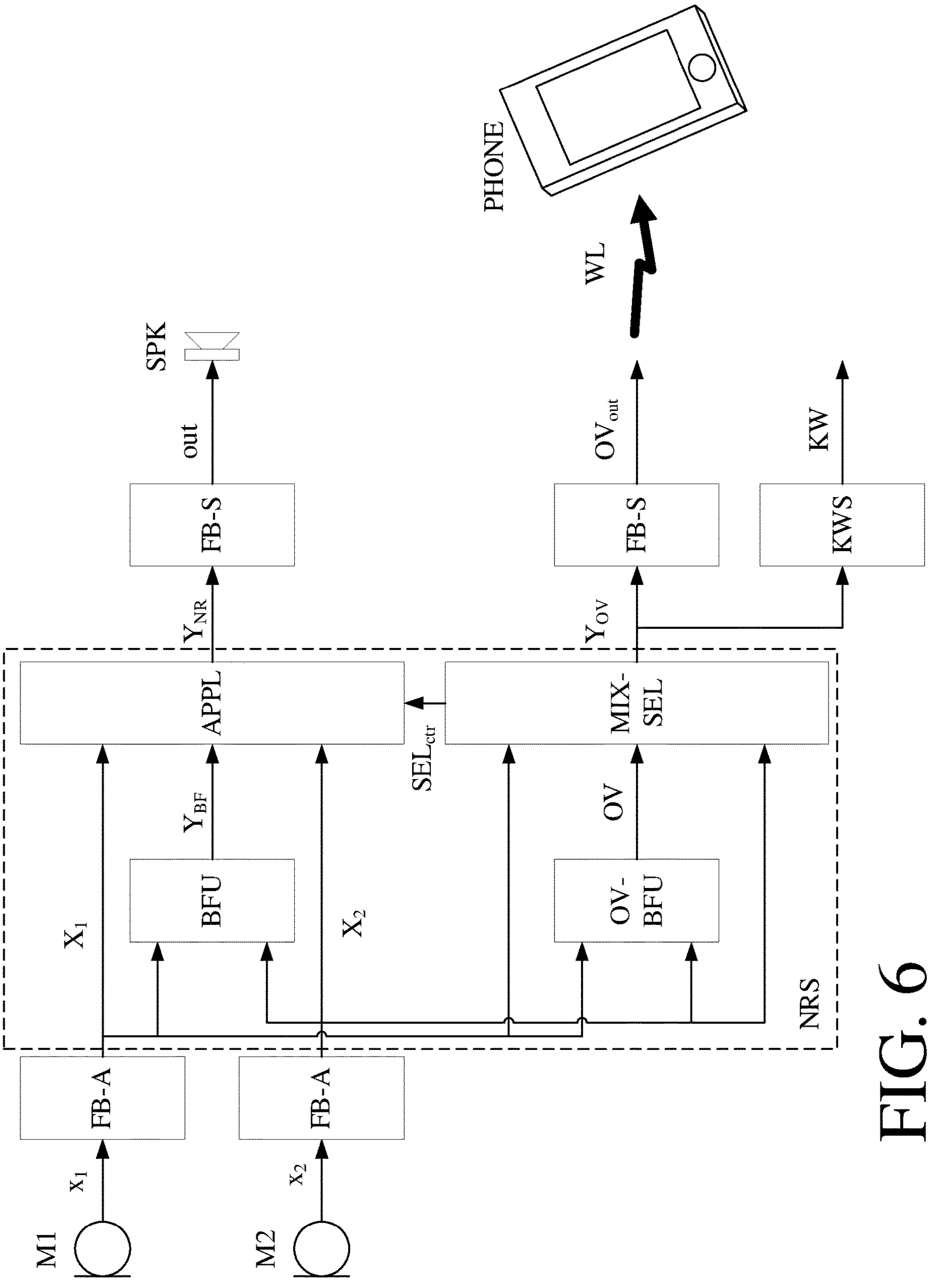
FIG. 6 shows a third embodiment of a hearing device according to the present disclosure.

FIG. 6 shows a third embodiment of a hearing device according to the present disclosure. The third embodiment of a hearing device comprises a third embodiment of a noise reduction system (cf. dashed enclosure denoted 'NRS' in FIG. 6) according to the present disclosure. The solution of FIG. 6 is (like FIG. 5) computationally less expensive than the solution of FIG. 4. Instead of reusing the decision from the (environment) beamformer (BFU) branch (=first audio signal path) in the own voice beamformer (OV-BFU) branch (=second audio signal path), the decision from the own voice beamformer branch is used in the beamformer branch, cf. arrow indicating a selection control signal (denoted $SEL_{ctr}$) from the second, independent, (MIX-SEL) to the first, passive, (APPL) mixing and/or selection unit. Depending on the current application, the hearing device may switch between the solutions illustrated in FIG. 5 and FIG. 6. The decision to switch between the two 'modes' may e.g. depend on whether own voice is detected or whether the current main application for the hearing device user is to listen to external sound or being part of a phone conversation. In general, the decision to switch between the two 'modes' may depend on a classifier of the current acoustic environment, voice, no-voice, own-voice, diffuse noise (e.g. wind), localized noise, etc. The mixing and/or selection units may all be inactive in certain acoustic environments (e.g. music, no diffuse noise, etc.).

Figure 7:
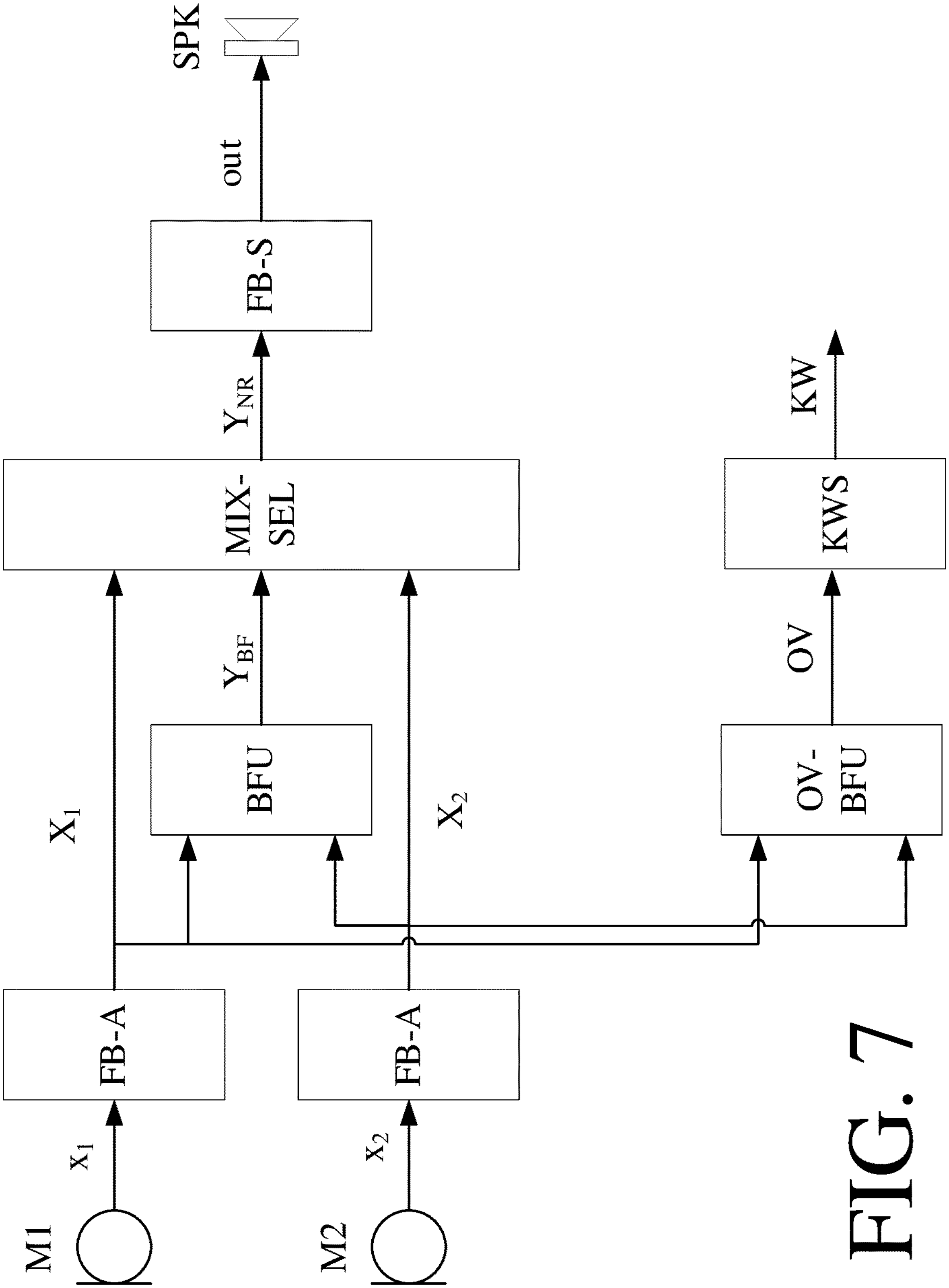
FIG. 7 shows a fourth embodiment of a hearing device according to the present disclosure.
Figure 8:
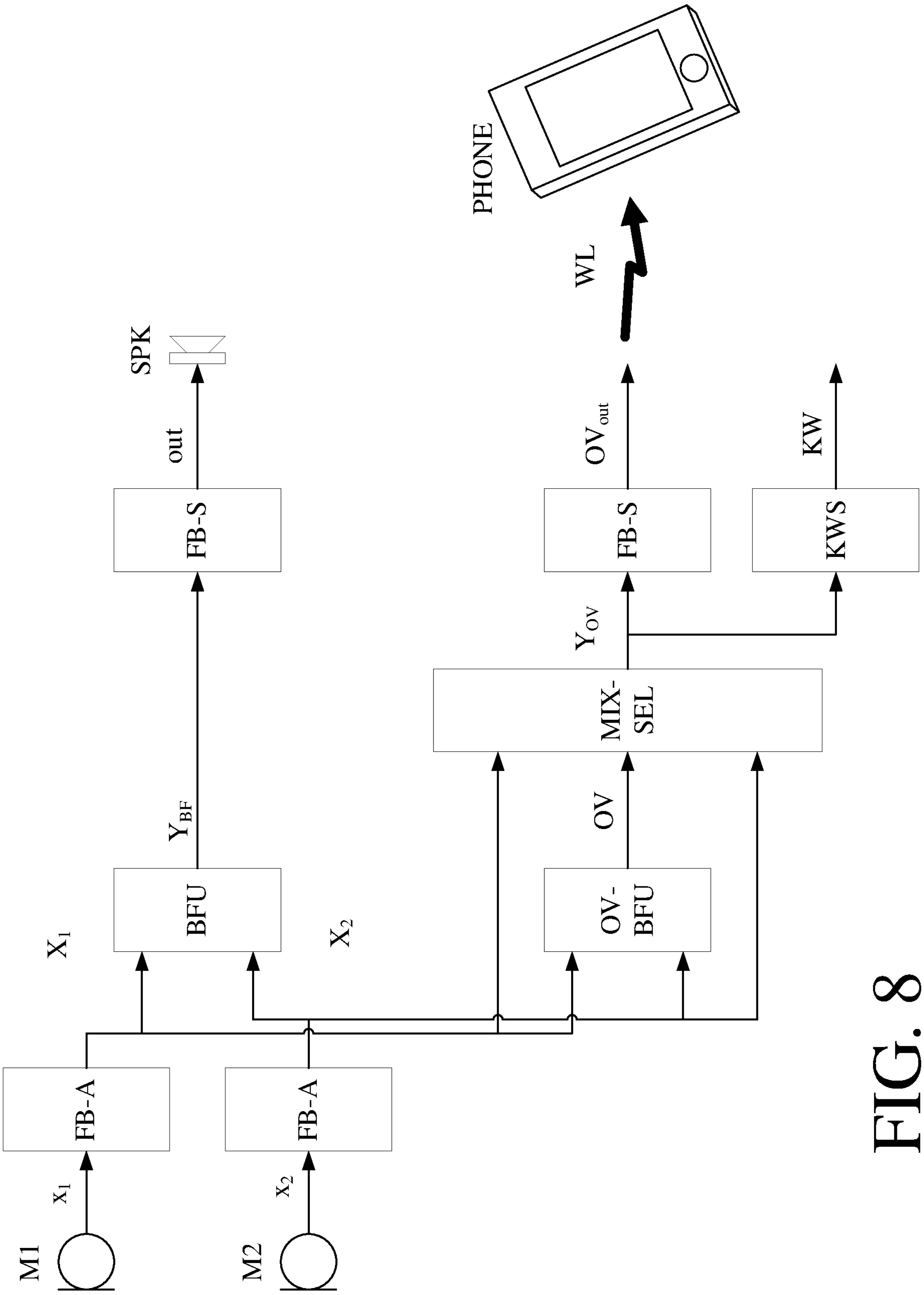
FIG. 8 shows a fifth embodiment of a hearing device according to the present disclosure.

FIG. 7 and FIG. 8 shows alternative implementations, where the wind noise reduction system (comprising a mixing and/or selection unit (MIX-SEL)) is only applied in either the main (BFU) processing branch or in the own voice processing branch, depending on where the wind noise reduction is most needed. Only applying the wind noise in one of the processing paths may be advantageous in order to save computational complexity as well as battery power. E.g. if the battery level is below a certain threshold, the wind noise reduction processing is only applied in one of the processing branches. If the battery level is even lower, the wind noise processing may be fully disabled in both processing paths.

FIG. 7 shows a fourth embodiment of a hearing device according to the present disclosure. FIG. 7 illustrates a first alternative solution. The wind noise enhancement solution is only applied in one of the processing paths. For most applications of hearing aids, the wind noise reduction is most important in the processing path, which enhances and presents sound to the hearing device user. It may be less important (compared to saving computational/battery power) to reduce wind noise in the secondary branch, if it is only used for keyword spotting. Whether the wind noise selection is also applied in the OV-BFU branch may depend on battery level, or whether own voice is detected or whether the user is having a phone conversation (see FIG. 8). For headsets, the consideration may be different, e.g. opposite, cf. FIG. 8.

FIG. 8 shows a fifth embodiment of a hearing device according to the present disclosure. FIG. 8 illustrates a second alternative solution. In special use cases like phone conversations, or when own voice is detected, it may be advantageous to base and apply the wind noise reduction enhancement selection in the own voice beamformer unit (OV-BFU) branch rather than in the BFU branch, as the main signal of interest for the user is the own voice signal to be transmitted to the far-end talker (e.g. in a headset application). If the own voice signal is not audible (for a far-end receiver) during wind, a phone conversation will not be possible.

Figure 9A:
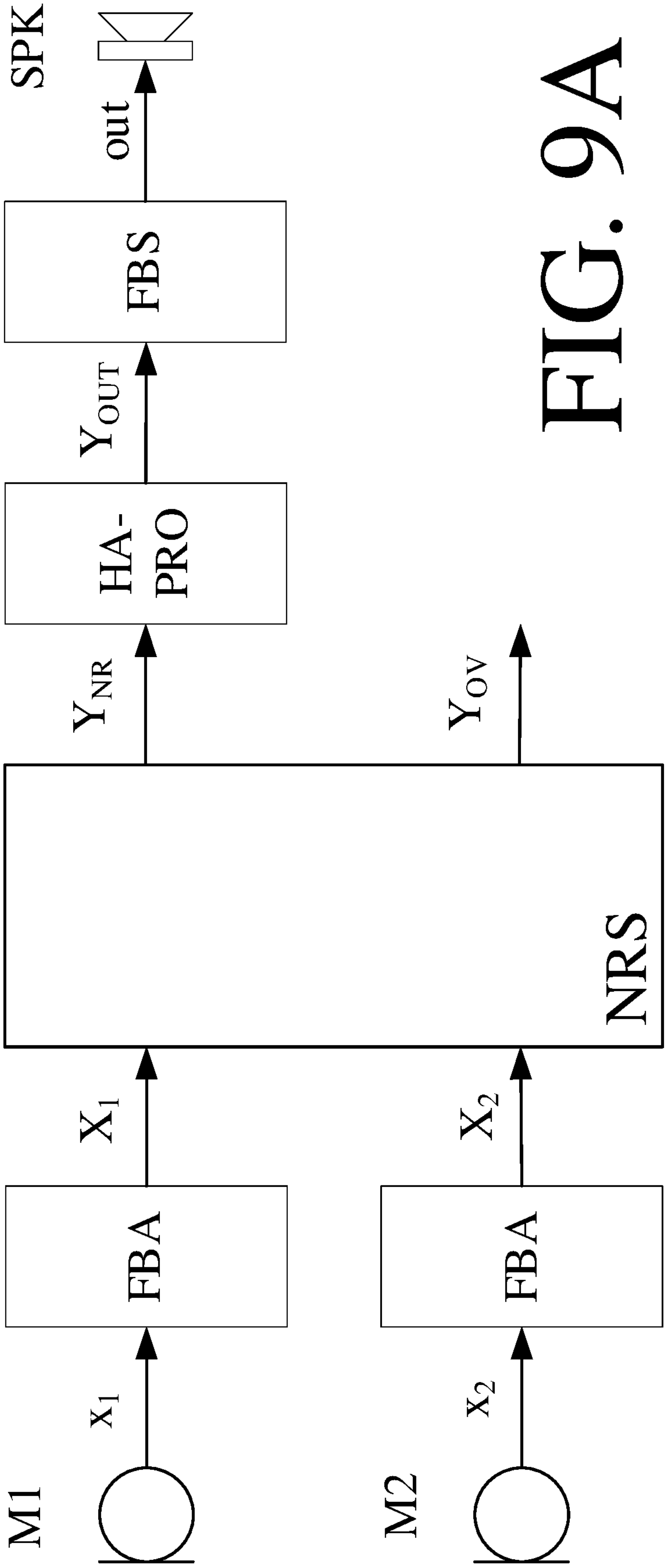
FIG. 9A shows a first generalized embodiment of a hearing device according to the present disclosure.

FIG. 9A shows a generalized embodiment of a hearing device according to the present disclosure. The embodiment of a hearing device of FIG. 9A is similar to the embodiments of FIG. 4-8, but additionally comprises a further processing part, e.g. a hearing aid processor (see e.g. HA-PRO in FIG. 9A) adapted to execute a hearing loss compensation algorithm (and/or other audio processing algorithms for providing gains to be applied to the input signal(s) or to the noise reduced signals, to be combined with (added and multiplied in the logarithmic and linear domain, respectively) the noise reduction gains ($G_{NR1}$, $G_{NR2}$) and applied to the respective transformed input signals ($X_1$, $X_2$) to provide a resulting enhanced signal, e.g. for presentation to the user of the hearing system. In the embodiment of FIG. 9A, the use of the second noise reduced signal ($Y_{OV}$) is not specified. The use of the noise reduced own voice estimate ($Y_{OV}$) may e.g. be as indicated in FIG. 4-8 (transmission to another device or used internally in the hearing aid).

Figure 9B:
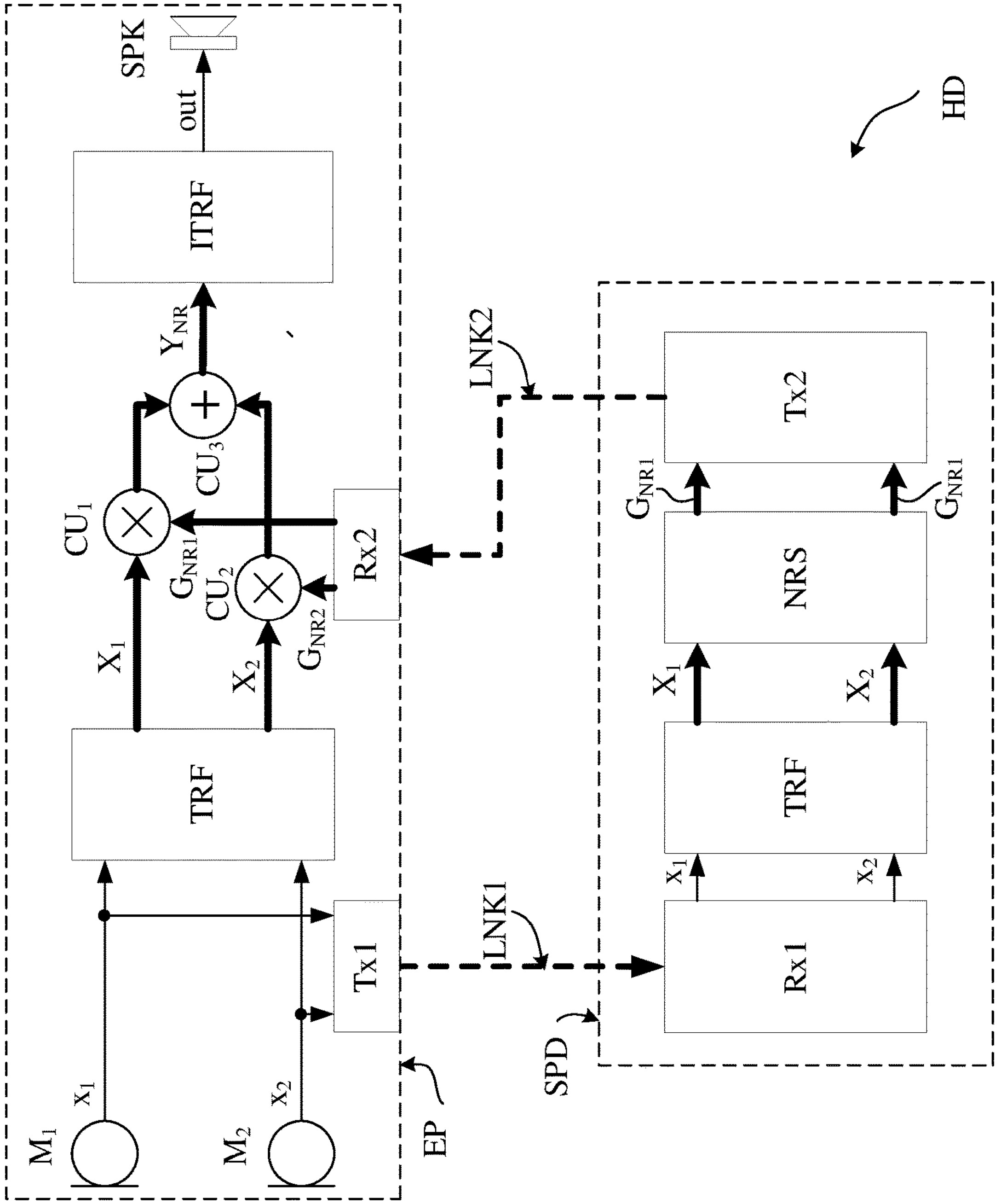
FIG. 9B shows a second generalized embodiment of a hearing device according to the present disclosure.

FIG. 9B shows an example of a hearing device (HD), e.g. a hearing aid, according to the present disclosure comprising an earpiece (EP) adapted for being located at or in an ear of the user and a separate (external) audio processing device (SPD), e.g. adapted for being worn by the user, wherein a processing, e.g. noise reduction according to the present disclosure, is performed mainly in the separate audio processing device (SPD). The earpiece (EP) of the embodiment of FIG. 9B comprises two microphones ($M_1$, $M_2$) for picking up sound at the earpiece (EP) and providing respective electric input signals ($x_1$, $x_2$) representing the sound. The input signals ($x_1$, $x_2$), or a representation thereof, are transmitted from the earpiece (EP) to the separate audio processing device (SPD) via a (wired or wireless) communication link (LNK1) provided by transceivers (transmitter (Tx1) and receiver (Rx1)) of the respective devices (EP, SPD). The receiver (Rx1) of the separate audio processing device (SPD) provides input signals ($x_1$, $x_2$) to respective transformation units (shown as one unit (TRF) in FIG. 9B). The transformation units may e.g. comprise an analysis filter bank or other transform unit as appropriate for the design in question. The transformed input signals ($X_1$, $X_2$) are fed to the noise reduction system (NRS) according to the present disclosure. The noise reduction system (NRS) of the provides respective noise reduction gains ($G_{NR1}$, $G_{NR2}$) for application to the transformed input signals ($X_1$, $X_2$). The noise reduction gains ($G_{NR1}$, $G_{NR2}$) are transmitted to the earpiece (EP) via a (wired or wireless) communication link (LNK2) provided by transceivers (transmitter (Tx2) and receiver (Rx2)) of the respective devices (SPD, EP). The earpiece (EP) comprises a forward path comprising respective transformation units (TRF) (as in the separate audio processing device (SPD) for converting time-domain input signals ($x_1$, $x_2$) to transformed input signals ($X_1$, $X_2$) in the transform domain (e.g. the (time-)frequency domain) The forward path further comprises combination units (CU1, CU2, CU3) for providing a resulting noise reduced signal ($Y_{NR}$) in dependence of the transformed input signals ($X_1$, $X_2$) and the received noise reduction gains ($G_{NR1}$, $G_{NR2}$). The combinations units (CU1 ('X'), CU2 ('X'), and CU3 ('+')) implement the following expression for the noise reduced signal ($Y_{NR}$):

$$Y_{NR}=G_{NR1}*X_1+G_{NR2}*X_2,$$

The forward path further comprises an inverse transform unit (ITRF), e.g. a synthesis filter bank, for converting the noise reduced signal ($Y_{NR}$) from the transform domain to the time domain (cf. signal 'out'). The resulting signal (out) is fed to an output transducer (here a loudspeaker (SPK)) of the forward path. The resulting (output) signal (out) is presented as stimuli perceivable by the user as sound (her as vibrations in air to the user's eardrum). The resulting signal (out) of the forward path may, e.g. in a telephone or headset mode, comprise a signal received from a far-end communication partner (as part of a 'telephone conversation').

The noise reduction system may likewise comprise a second output signal, e.g. an own voice signal or corresponding gains for application to the input signals (e.g. $X_1$, $X_2$) to provide a (noise reduced) own voice signal. (e.g. for transmission to a far-end communication partner (as part of a 'telephone conversation')). The second output transducer (e.g. transmitter) for transmitting the own voice signal to a communication device may e.g. be located in the separate audio processing device (SPD). The own voice signal may alternatively (or additionally) be fed to a keyword spotting system for identifying a keyword (e.g. a wake-word) of a voice control interface of the hearing system. The keyword spotting system (comprising keyword detector) may e.g. be located fully or partially in the earpiece (EP) or fully or partially in the separate audio processing device (SPD).

The separate audio processing device (SPD) (or the earpiece EP) may e.g. comprise a further processing part (see e.g. HA-PRO in FIG. 9A) adapted to apply one or more audio processing algorithms to the noise reduced signal ($Y_{NR}$) and/or to the noise reduction gains ($G_{NR1}$, $G_{NR2}$) to provide a resulting enhanced signal, e.g. for presentation to the user of the hearing system.

The earpiece (EP) and the separate audio processing device (SPD) may be connected by an electric cable. The links (LNK1, LNK2) may, however, be a short-range wireless (e.g. audio) communication link, e.g. based on Bluetooth, e.g. Bluetooth Low Energy.

The communication links LNK1 or LNK2 may be wireless links, e.g. low latency links (e.g. having transmission delays of less than 1 ms, 5 ms, or less than 8 ms, e.g. based on Ultra WideBand (UWB) or other low latency technology. The separate audio processing device (SPD) provides the hearing system with more processing power compared to local processing in the earpiece (EP), e.g. to better enable computation intensive tasks, e.g. related to learning algorithms, such as neural network computations.

In the above description, the earpiece (EP) and the separate audio processing device (SPD) are assumed to form part of the hearing system, e.g. the same hearing device (HD). The separate audio processing device (SPD) may be constituted by a dedicated, preferably portable, audio processing device, e.g. specifically configured to carry out (at least) more processing intensive tasks of the hearing device.

The separate audio processing device (SPD) may be a portable communication device, e.g. a smartphone, adapted to carry out processing tasks of the earpiece, e.g. via an application program (APP), but also dedicated to other tasks that are not directly related to the hearing device functionality.

The earpiece (EP) may comprise more functionality than shown in the embodiment of FIG. 9B.

The earpiece (EP) may e.g. comprise a forward path that is used in a certain mode of operation, when the separate audio processing device (SPD) is not available (or intentionally not used). In such case the earpiece (EP) may perform the normal function of the hearing device (e.g. with reduced performance). The wind noise reduction system according to the present disclosure may be activated in a specific mode of operation of the hearing device, e.g. in a specific program, e.g. related to a voice control interface, and/or to a communication ('headset') mode of operation.

The hearing device (HD) may be constituted by a hearing aid (hearing instrument) or a headset.

Figure 10:
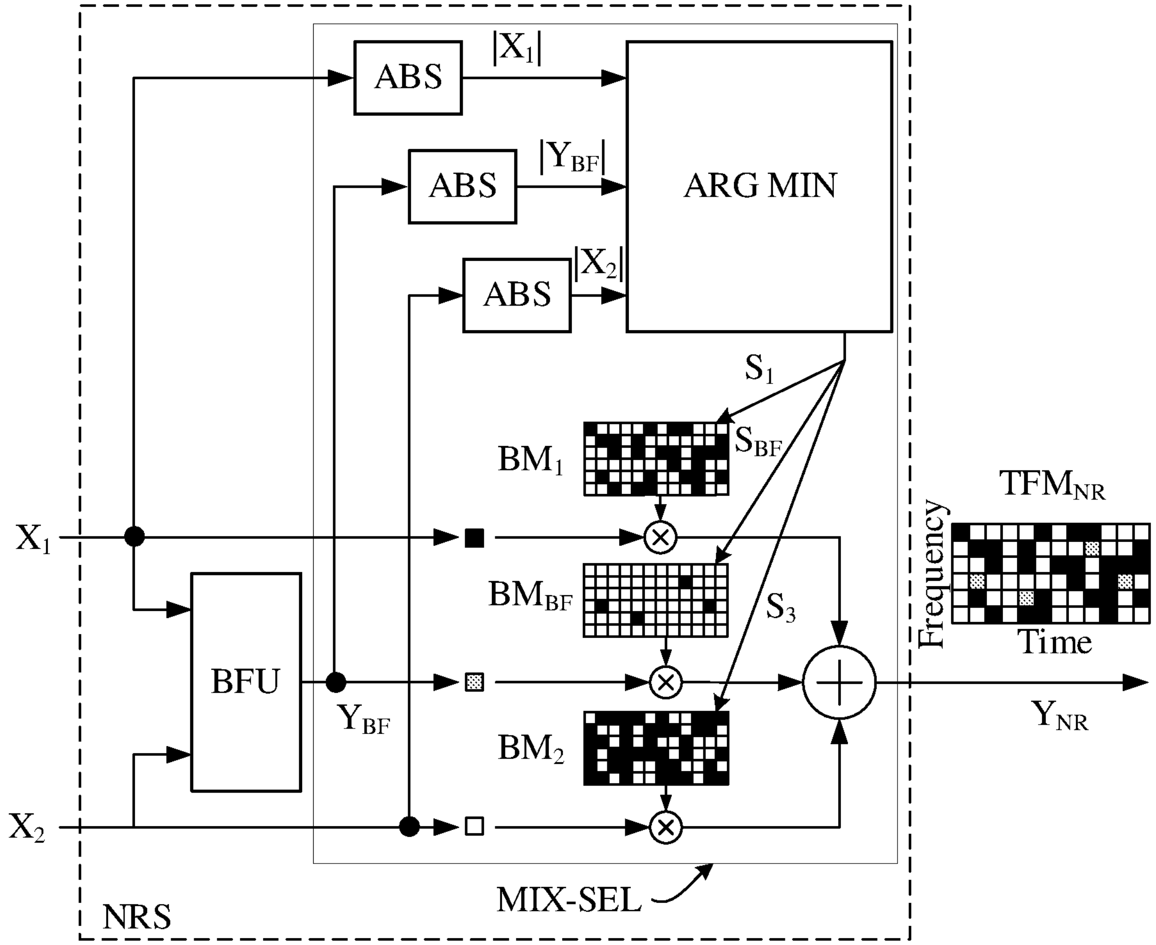
FIG. 10 shows an embodiment of a part of a noise reduction system according to the present disclosure.

FIG. 10 shows an embodiment of a noise reduction system (NRS), e.g. a noise reduction system for reducing wind noise in a processed signal based on a multitude (e.g. two or more) of input transducers, e.g. microphones, according to the present disclosure. The noise reduction system (NRS) comprises a first beamformer filter (BFU) configured to receive two electric input signals ($X_1$, $X_2$) in a time-frequency representation (m,k) and having a first sensitivity in a first spatial direction, and to provide a first beamformed signal ($Y_{BF}$). The noise reduction system (NRS) further comprises a first noise reduction controller (MIX-SEL) configured to receive the two electric input signals ($X_1$, $X_2$), or signals based thereon, and the first beamformed signal ($Y_{BF}$), or a signal based thereon. The first noise reduction controller (MIX-SEL) is configured to determine a first noise reduced signal ($Y_{NR}$), or first and second noise reduction gains ($G_{NR}$), respectively, according to a first adaptive selection scheme. The first adaptive selection scheme comprises that a given time-frequency bin (or TF-unit) (k,m) of the first noise reduced signal ($Y_{NR}$), or the first noise reduction gains ($G_{NR}$), is determined from the content of the time-frequency bin (km) among the two electric input signals ($X_1$, $X_2$), and the first beamformed signal ($Y_{BF}$), or a signal based thereon, having the smallest magnitude ($|X_1|$, $|X_2|$, $|Y_{BF}|$). This is implemented in the embodiment of FIG. 10 by the respective ABS-blocks providing the magnitudes ($|X_1|$, $|X_2|$, $|Y_{BF}|$) of the respective input signals ($X_1$, $X_2$, $Y_{BF}$) in a time frequency representation (m,k) and the ARG MIN-block, which for a given time frame (e.g. m'), for each frequency band k=1, K, where K is the number of frequency bands considered, selects the TF-unit (among $|X_1|$, $|X_2|$, $|Y_{BF}|$) that has the lowest magnitude. For the $k'^{th}$ frequency band of time frame m', the contents of TF-unit (m', k') of the first noise reduced signal ($Y_{NR}$) is thus equal to the contents of TF-unit (m', k') among $|X_1|$, $|X_2|$, $|Y_{BF}|$ that has the lowest magnitude. In the schematic example of FIG. 10 (and FIG. 2, 3) the first noise reduced signal ($Y_{NR}$) is a linear combination of the input signals ($X_1$, $X_2$, $Y_{BF}$) with the respective binary masks ($BM_1$, $BM_2$, $BM_{BF}$). In the resulting time-frequency representation of ($TFM_{NR}$) of the first noise reduced signal ($Y_{NR}$), the color of a given time frame indicates from which of the three input signals to the noise reduction controller (MIX-SEL) that the TF-unit in question originates:

- a black TF-unit indicates that it originates from the first electric input signal ($X_1$);
- a grey TF-unit indicates that it originates from the first beamformed signal ($Y_{BF}$); and
- a white TF-unit indicates that it originates from the second electric input signal ($X_2$).

The corresponding binary masks ($BM_1$, $BM_2$, $BM_{BF}$) would then contain a '1' for a specific TF-unit (m',k') of a given input signal ($X_1$, $X_2$, $Y_{BF}$), e.g. $X_1$, that is selected for use in the first noise reduced signal ($Y_{NR}$) and a '0' for that TF-unit (m',k') of the respective other input signals (e.g. ($X_2$, $Y_{BF}$)) that are NOT selected for use in the first noise reduced signal ($Y_{NR}$). According to this scheme, the binary masks ($BM_1$, $BM_2$, $BM_{BF}$) illustrated in FIGS. 2 and 3 (and FIG. 10, where the binary masks are taken from FIG. 3), the black TF-units would contain a '1' and the white TF-units would contain a '0'.

The ABS-blocks may comprise a further modification of the input signals to the ARG-MIN block. A bias may be applied to the input of the ABS or ARG-MIN block. The bias may prioritize the selection of a given one of the inputs (e.g. the DIR signal), which may make the system more stable (see also FIG. 2C, 4B, 4C, 5, in EP2765787A1 referring to 'normalization filters' to ease comparison of the input signals).

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

EP2765787A1 (Oticon, EPOS Group, Sennheiser Electronic) 13 Aug. 2014

The invention claimed is:

1. A hearing device comprising an earpiece adapted to be worn at an ear of a user, the hearing device comprising:

an input stage comprising a multitude of input transducers for providing a corresponding multitude of electric input signals representing sound in an environment around the hearing device, each electric input signal being provided in a digitized form, and further in a time-frequency representation comprising a number of frequency bands k and a number of time instances m;

a noise reduction system comprising:

a first beamformer filter configured to receive said multitude of electric input signals and having a first sensitivity in a first spatial direction, and to provide a first beamformed signal;

a second beamformer filter configured to receive said multitude of electric input signals and having a second sensitivity in a second spatial direction, different from said first spatial direction, and to provide a second beamformed signal;

a first noise reduction controller configured to receive said multitude of electric input signals, or a signal or signals based thereon, and said first beamformed signal, or a signal based thereon, a second noise reduction controller configured to receive said multitude of electric input signals, or a signal or signals based thereon, and said second beamformed signal, or a signal based thereon, wherein the first and second noise reduction controller are configured to determine a first and a second noise reduced signal, or first and second noise reduction gains, respectively, according to first and second adaptive selection schemes, respectively, wherein the first adaptive selection scheme comprises that a given time-frequency bin (k,m) of the first noise reduced signal, or the first noise reduction gains, is determined selecting among the time-frequency bins (k,m) of each of said multitude of electric input signals and said first beamformed signal, or of signals derived therefrom, the time-frequency bin (k,m) comprising the least energy or having the smallest magnitude;

wherein the second adaptive selection scheme comprises that a given time-frequency bin (k,m) of the second noise reduced signal, or the second noise reduction gains, is determined by selecting among the time-frequency bins (k,m) of each of said multitude of electric input signals and said second beamformed signal, or of signals derived therefrom, the time-frequency bin (k,m) comprising the least energy or having the smallest magnitude;

an output stage comprising at least one of:

a first output transducer located in said earpiece and configured to provide output stimuli perceivable as sound to the user in dependence of said first noise reduced signal or gains, or a signal or signals or gains based thereon; and a second output transducer comprising a transmitter for transmitting an audio signal provided in dependence of said second noise reduced signal or gains, or a signal or signals based thereon, to an external device; and a keyword detector or a part thereof configured to receive said second noise reduced signal or gains, or a signal or signals based thereon.

2. A hearing device according to claim 1 wherein the first beamformer filter is configured to have maximum sensitivity or unit sensitivity in a direction of a target signal source in said environment to provide that the first beamformed signal comprises an estimate of the target signal.

3. A hearing device according to claim 1 wherein the second beamformer filter is configured to have maximum sensitivity or unit sensitivity in a direction of the user's mouth to provide that the second beamformed signal comprises the user's voice when the user is vocally active.

4. A hearing device according to claim 1 wherein the output stage comprises a separate synthesis filter bank for each of said at least one output transducer.

5. A hearing device according to claim 1 wherein the output stage comprises said first and second output transducers.

6. A hearing device according to claim 1 wherein the input stage comprises a separate analysis filter bank for each of said multitude of input transducers.

7. A hearing device according to claim 1 wherein the keyword detector is configured to detect a specific word or combination of words when spoken by the user, and wherein the keyword detector is connected to the second beamformer filter.

8. A hearing device according to claim 1 comprising a transceiver, including said transmitter of said second output transducer and further comprising a receiver, configured to allow an audio communication link to be established between the hearing device and the external device.

9. A hearing device according to claim 1 wherein said first noise reduction controller is configured to control the determination of the first as well as the second noise reduced signal.

10. A hearing device according to claim 1 being constituted by or comprising at least one earpiece and a separate processing device, wherein the at least one earpiece and the separate processing device are configured to allow an audio communication link to be established between them.

11. A hearing device according to claim 10 wherein said at least one earpiece comprises at least one of said multitude of input transducers for providing a corresponding multitude of electric input signals representing sound in an environment around the hearing device, and said first output transducer, and wherein said separate processing device comprises at least a part of said noise reduction system.

12. A hearing device according to claim 1 configured to dynamically switch between which of the first and second beamformed signals to include in the determination of the first and second noise reduced signals or noise reduction gains.

13. A hearing device according to claim 12 wherein the dynamical switching is controlled in dependence of an own voice detection signal.

14. A hearing device according to claim 1 where the first or second noise reduction controller is activated in dependence of battery power or level.

15. A hearing device according to claim 1 being constituted by or comprising a hearing aid or a headset or an earphone or an active ear protection device, or a combination thereof.

16. A method of operating a hearing device comprising an earpiece adapted to be worn at an ear of a user, the method comprising:

providing a multitude of electric input signals representing sound in an environment around the hearing device, each electric input signal being provided in a digitized form, and further in a time-frequency representation comprising a number of frequency bands (k) and a number of time instances (m);

providing noise reduction by:

providing a first beamformed signal by a first beamformer filter based on at least two of said multitude of electric input signals, the first beamformer filter having a first sensitivity in a first spatial direction;

providing a second beamformed signal by a second beamformer filter based on at least two of said multitude of electric input signals, the second beamformer filter having a second sensitivity in a second spatial direction, different from said first spatial direction;

determining a first noise reduced signal, or first noise reduction gains, respectively, according to a first adaptive selection scheme, in dependence of said multitude of electric input signals, or a signal or signals based thereon, and said first beamformed signal, or a signal based thereon;

determining a second noise reduced signal, or second noise reduction gains, according to a second adaptive selection scheme, in dependence of said multitude of electric input signals, or a signal or signals based thereon, and said second beamformed signal, or a signal based thereon;

wherein the first adaptive selection scheme comprises that a given time-frequency bin (k,m) of the first noise reduced signal, or the first noise reduction gains, is determined by selecting among the time-frequency bins (k,m) of each of said multitude of electric input signals and said first beamformed signal, or of signals derived therefrom, the time-frequency bin (k,m) comprising the least energy or having the smallest magnitude;

wherein the second adaptive selection scheme comprises that a given time-frequency bin (k,m) of the second noise reduced signal, or the second noise reduction gains, is determined by selecting among the time-frequency bins (k,m) of each of said multitude of electric input signals and said second beamformed signal, or of signals derived therefrom, the time-frequency bin (k,m) comprising the least energy or having the smallest magnitude; and at least one of:

providing output stimuli perceivable as sound to the user in dependence of said first noise reduced signal or gains, or a signal or signals or gains based thereon; and transmitting an audio signal provided in dependence of said second noise reduced signal or gains, or a signal or signals based thereon, to an external device; and detecting a keyword or a part thereof in dependence of said second noise reduced signal or gains, or a signal or signals based thereon.

17. A computer program comprising instructions which, when the program is executed by a computer, cause the computer to carry out the method of claim 16.

* * * * *